United States Patent Office 3,702,745
Patented Nov. 14, 1972

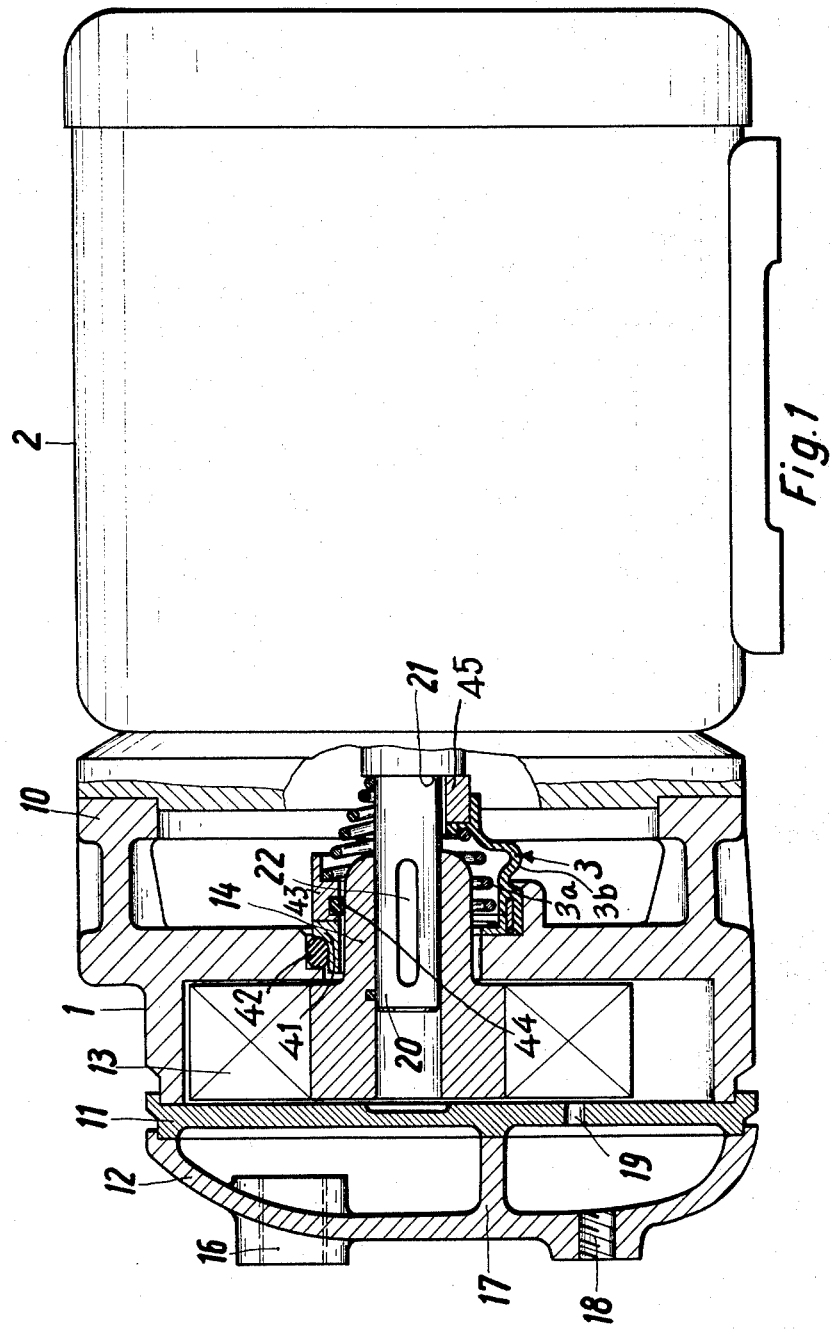

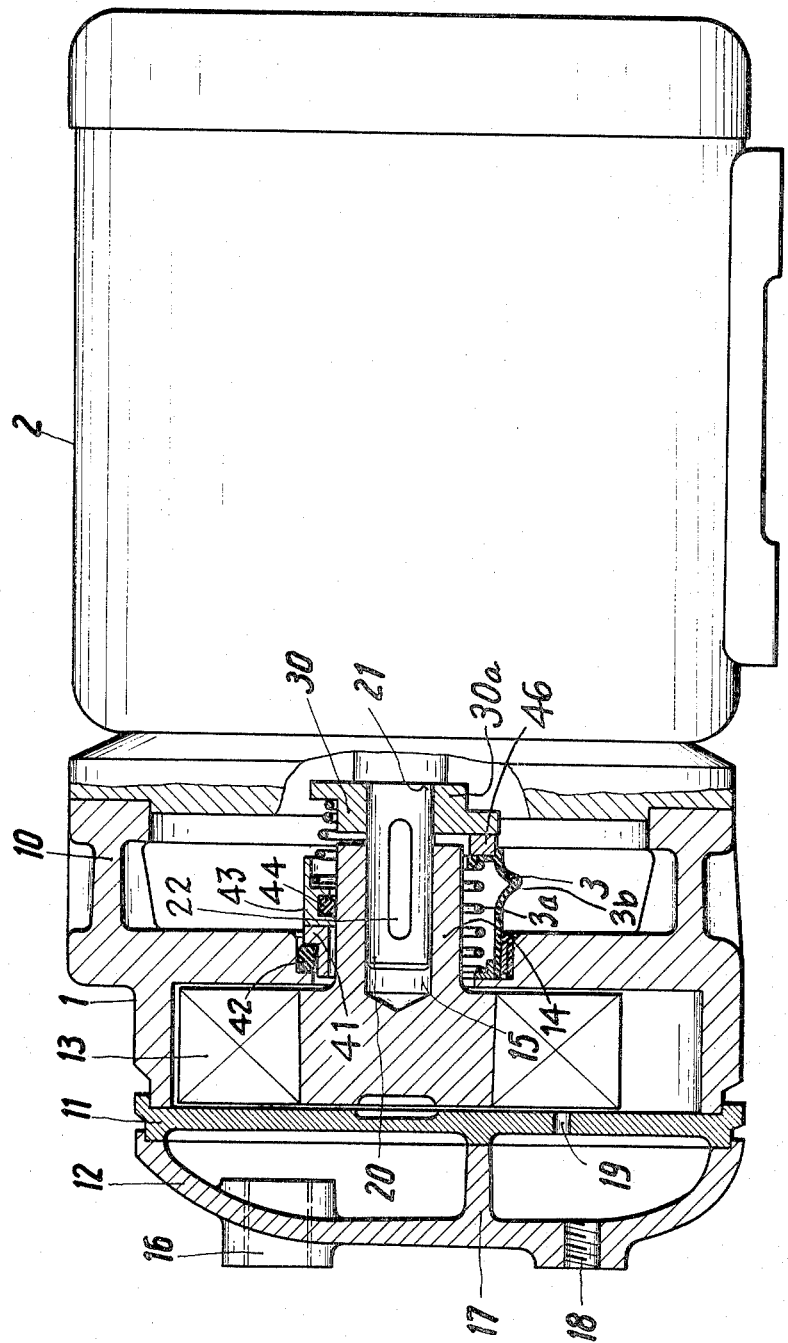

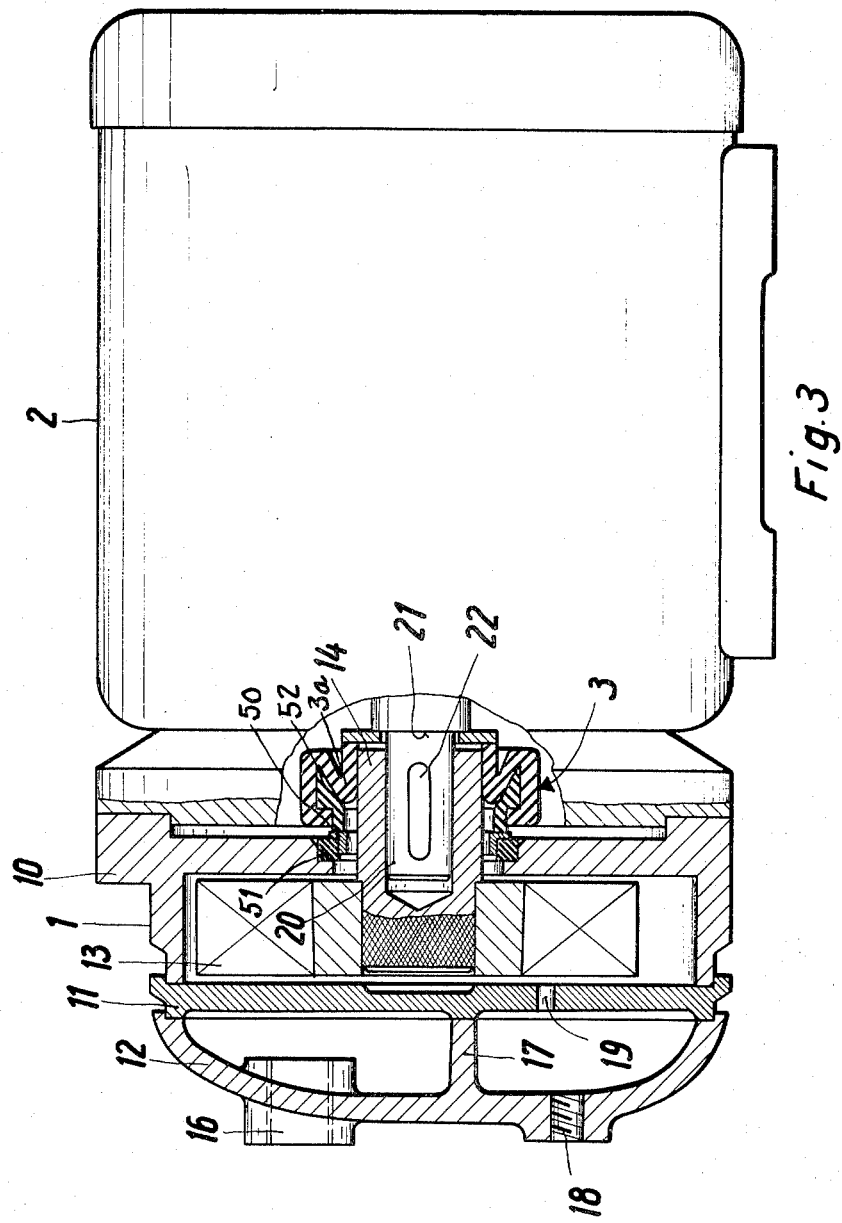

3,702,745
LIQUID PISTON ROTARY GAS PUMP ASSEMBLY
Udo Segebrecht, Heiligenstedten, Germany, assignor to Siemen & Hinsch mbH, Itzehoe-Holstein, Germany
Filed Jan. 26, 1971, Ser. No. 109,907
Claims priority, application Germany, Jan. 31, 1970,
P 20 04 393.0
Int. Cl. F04c 19/00; F04b 17/00, 35/04; F01d 11/08
U.S. Cl. 417—68  6 Claims

ABSTRACT OF THE DISCLOSURE

The invention relates to a liquid piston rotary gas pump assembly which comprises, on one hand, a liquid piston gas pump including a rotor and a casing, and, on the other, a flanged motor, and wherein the casing of the pump is mounted to the flange of the motor, the hub of the rotor is supported by the stub shaft of the flanged motor and a dynamic axial seal member serves as a seal between the shaft and the pump casing.

---

The rotor which rotates within the pump casing is enclosed on both ends by portions of the pump casing with a slight axial clearance. The pressure differentials to be handled by the dynamic seal are relatively small in this type of liquid piston rotary gas pumps. The elements of such pumps which are exposed to wear are, in the first place, the rotor, the axially adjacent portions of the pump casing and the sealing surfaces of the dynamic seal.

Desirable features of such pumps are a long useful life, this being determined in the first place by the wear on the rotor and the casing portions adjacent thereto, simple and inexpensive construction, easy replacement of the dynamic seal and easy assembly. These objects are not met by the known constructions. Thus, in the pump disclosed in German Pat. No. 835,832, which per se would be suited for being directly combined with a flanged motor, the rotor is axially fixed to the shaft by being biased against the annular backing washer by the spring of the dynamic seal. Longitudinal tolerances of the shaft and axial displacements of the shaft relative to the pump casing, such as may be caused by variations in temperature, for example, result in the rotor striking against one or the other of the adjacent axial end portions of the casing, whereby considerable wear must be expected and the useful life is proportionally reduced. A further disadvantage of the pump is that the pump casing must be disassembled and the rotor must be removed from the shaft for inspection and maintenance as well as when it is desired to replace the dynamic seal; a further objectionable feature is that the dynamic seal structure is of considerable axial length because its end facing the motor is enclosed by portions of the casing, whereby the thickness of such casing portions combines with the length of the sealing structure, and because the dynamic seal structure is supported on the opposite end by the rotor hub, which is axially extended toward the motor. Due to this considerable structural length, the flanged motor must be provided with a shaft which is specially manufactured to meet the requirements of this pump, and which is further rendered expensive by the fact that its length must be machined with very close tolerances in view of the desired axially fixed position of the rotor.

The same drawbacks are exhibited by the pump disclosed in German Pat. No. 1,037,860, which also calls for a dynamic seal of considerable axial length and requires a specially manufactured shaft having a peripheral groove between the rotor of the pump and the dynamic seal for accommodating a spring ring and two transverse bores for pins. Furthermore, the rotor is not mounted for free axial movement in this construction because it is biased by the spring ring acting on the end thereof facing the motor, whereby considerable wear must be expected. The dynamic seal cannot be serviced nor exchanged when required but after complete disassembly of the pump casing.

It is the object of the invention to provide a motor driven pump of the general type specified above wherein these drawbacks are eliminated and which, owing to reduced wear on the rotor and the casing portions adjacent thereto, has a longer useful life, which is easy to assemble, and wherein the dynamic seal can, in particular, be inspected, serviced and replaced whenever required without having to entirely disassemble the pump, and which finally prmits the use of a cheaper flanged motor construction having a standard shaft.

This is accomplished by the present invention by employing a motor having a short cylindrical stub shaft of standard length, the stub shaft having an elongated key groove and a collar or shoulder, the hub of the rotor being extended through and beyond the wall which defines the pump casing on the side facing the motor, the said hub being mounted on the stub shaft for free axial movement both ways and the dynamic seal being disposed externally of this wall and resting against this wall on one hand and on the shaft collar or shoulder on the other.

The combination of features in accordance with this invention permits for the first time the construction of a pump assembly comprising a pump casing and a flange-mounted motor, wherein the rotor is mounted on the shaft for axial movement and is therefore exposed to reduced wear only, as is known per se in other types of pumps. In addition, the assembly is extremely simple to mount and the sealing washer is easy to inspect, to maintain and to replace because the pump casing may be detached from the motor as a unit to provide full access to the seal. Finally, the pump of this invention permits the use of a motor having a normal standardized stub shaft which is far cheaper than one requiring a specially manufactured shaft.

In order to permit the pump assembly to be equipped with a serially manufactured dynamic seal, wherein the spring is dimensioned for the same shaft diameter as the remaining rotary portion of the seal or to dispose a rotary annular seal on the collar of the shaft, the rotary portion of the dynamic seal is suitably provided with a ring on the end facing the motor, which ring is movable axially to engage the shaft collar of the flanged motor and is locked, together with the rotor supporting sleeve, by a key and groove provided on the stub shaft of the flanged motor. It is further advantageous to provide the motor stub shaft receiving bore in the pump rotor supporting sleeve in the form of a blind bore or to close that end thereof remote from the motor, because sealing the gap between the stub shaft and sleeve is thereby rendered unnecessary.

Finally, it is particularly profitable to produce the rotor supporting sleeve and the rotor, or the rotor alone, from synthetics, whereby price and weight economy is achieved over constructions of these elements from metal and whereby, in particular, the axial load on the shaft bearings of the motor, which results from the elements being disposed on the stub shaft in a cantilever fashion, is reduced.

Other advantages and features of this invention will be apparent to those skilled in the art upon reference to the accompanying specification, claims and drawings in which FIGS. 1 to 3 are partially sectional views showing respective embodiments of a liquid piston rotary gas pump assembly constructed in accordance with the present invention, the pump and seal being shown in section, while the motor is shown in elevation.

In FIGS. 1 to 3, the liquid piston rotary gas pump is designated by reference numeral 1, numerals 2 and 3 respectively designating the flanged motor and the dynamic seal.

The liquid piston rotary gas pump substantially comprises a casing 10, an intermediate member 11, a cover 12, a rotor 13 and a sleeve 14. The cover 12 contains the suction intake and pressure outlet, of which one is shown at 16, a portion of a partition 17 and an operating liquid inlet 18. The operating liquid enters the rotor cells or spaces of the pump defined by the blades through a bore 19 provided in the intermediate member 11, while the partition 17 serves to separate spaces in which different pressures reside or different fluids are contained.

The flanged motor 2 includes a stub shaft 20, the shaft collar or shoulder 21 and key and groove means 22.

The upper half of FIG. 1 shows the assembly sealed by means of a conventional dynamic seal of a type in general use for sealing purposes internally of pumps, with the exception that the seal rotates externally and that the spring 3a of the dynamic seal 3 in accordance with the invention is backed by the shaft collar 21 rather than by the motor casing.

As shown in FIG. 1, the stationary ring 41 is secured in the pump housing by sealing ring 42. The movable ring 43 which is rotatable with the pump impeller is sealed against the impeller hub by means of the sealing ring 44. It is pressed against ring 41 by spring or resilient means 3a, which is backed up by collar 21 of the motor shaft.

The lower portion of FIG. 1 illustrates an external stationary dynamic seal 3 having one end thereof sealingly press-fitted into the casing while the rotary part thereof is formed directly by the shaft collar or shoulder 21 of the flanged motor 2.

A stationary sealing surface is formed by the collar 21 of the motor shaft. The axially movable ring 45 is pressed against this sealing surface by spring 3a and is sealed against the pump housing by a bellows 3b of the dynamic seal 3.

Likewise, the upper and lower portions of FIG. 2 illustrate two different embodiments of the dynamic seal means and respective rings 30, the ring 30 being locked against relative rotation together with the rotor supporting sleeve by the key and groove means provided on the stub shaft for drive transmission to the dynamic seal. The bore 15 of sleeve 14 for receiving the stub shaft is in the form of a blind bore.

As shown in FIG. 2 the stationary ring 41 is sealed against the pump housing by sealing ring 42. The axially movable sliding ring 43 is sealed with respect to the impeller hub by sealing ring 44 and pressed against the other sealing surface by spring 3a which is backed by a further stationary ring 30 that is supported by the collar of the motor shaft.

Stationary ring 30a has a pressure fit on the motor shaft. The axially movable ring 46 is sealed with respect to the motor housing by bellows 3b and is biased against the other sealing surface by spring 3a.

As shown in FIG. 3, the stationary ring 50 is supported by a further ring 51. Ring 50 is so fitted on ring 51 and ring 51 is so fitted into the bore of the pump housing that no further sealing is necessary. The axially movable sliding ring 52 is incorporated in a bellows 3a which is sealingly fitted on to the hub 14 of the impeller and is backed by the collar 21 of the motor shaft. The bellows 3a provides not only the sealing between the axially movable ring 52 and the impeller shaft but also the bias of ring 52 against ring 50.

An embodiment of the assembly which is of particularly reduced axial length is illustrated in FIG. 3, wherein the dynamic seal 3 has no separate resilient biasing element, axial contact between the sliding contact surfaces and conjoint radial movement of the rotating parts of the seal being effected by a diaphragm made of an elastomeric material. The pump shown in FIG. 3 comprises a rotor of synthetics which, in the present embodiment, is press-fitted onto the knurled periphery of the sleeve or, instead, integrated with the knurled sleeve in the course of production by casting techniques.

In the instances of FIGS. 1 and 2, the rotor 13 may be produced integrally with the sleeve 14 of metal or synthetics, as desired.

The advantages obtained by the invention are in the first place the feedom of axial movement of the rotor supporting sleeve on the shaft whereby the rotor is capable of clearing the ends of the casing by receding, when hitting one end wall of the casing, toward the opposite end wall thereof so that it tends to assume an intermediate position between the casing portions, the axially movable sleeve being not exposed to the resilient bias acting on the dynamic seal, whereby no endwise loads on the surfaces of the rotor and the casing elements occur, while, on the other hand, the position and the stress of the dynamic seal is independent from the axial position of the rotor, and therefore the development of leaks at the sliding contact surfaces of the dynamic seal upon axial displacement of the rotor is avoided.

While the embodiments illustrated in the drawing and described herein by way of example relate to assemblies wherein the shaft is disposed in horizontal position, the invention may be applied to assemblies having vertically disposed shafts because the support of the dynamic seal is independent from the position of the assembly in space.

Numerous other modifications may be made to the forms of the invention described herein without departing from the spirit and scope of the invention.

I claim:

1. A liquid piston rotary gas pump assembly which comprises, in combination, a liquid piston rotary gas pump having a rotor means and a casing, a dynamic seal means and a flanged motor, said motor having a cylindrical shaft with an elongated key groove and a shaft collar, the casing of said pump being mounted on the flange of said motor said rotor means having a hub supported by said shaft of said flanged motor and extending through and beyond the wall defining said pump casing on the end facing the motor, said hub being mounted on said shaft for free axial movement both ways, and said dynamic seal means being disposed externally of the said wall and resting against said wall on one hand and against said shaft collar on the other so as to seal said shaft from said casing.

2. An assembly of claim 1, wherein said dynamic seal means includes a rotary portion, said rotary portion having a sealing ring on the end facing the motor, said ring being movable in an axial direction, resting against said shaft collar of said motor and is locked against relative rotation by said key and groove means.

3. The assembly of claim 2 including a bellows means sealingly fitted to said hub and backed by said collar for sealing between said ring and said shaft.

4. An assembly of claim 1, wherein said hub is provided with a bore, said bore receiving said motor shaft and is sealingly closed on the end remote from said motor.

5. An assembly of claim 1, wherein said means is made of synthetic material.

6. The assembly of claim 1 wherein said dynamic seal means includes a first axially movable sliding ring forming a first sealing surface, a second axially movable sliding ring forming a second sealing surface, and resilient means biasing said first ring against said second ring.

References Cited

UNITED STATES PATENTS

| | | | |
|---|---|---|---|
| 2,217,746 | 10/1940 | Hawley, Jr. | 415—170 A |
| 2,598,484 | 5/1952 | Adams | 415—170 A |
| 3,542,496 | 11/1970 | Bergeson et al. | 415—170 A |
| 3,551,067 | 12/1970 | Wissman | 415—170 A |
| 3,552,888 | 1/1971 | Ericksson | 415—170 A |

ROBERT M. WALKER, Primary Examiner

U.S. Cl. X.R.

417—410; 415—170 A